United States Patent
Rowitch

(10) Patent No.: US 7,127,011 B2
(45) Date of Patent: Oct. 24, 2006

(54) PROCEDURE FOR JAMMER DETECTION

(75) Inventor: Douglas N. Rowitch, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 743 days.

(21) Appl. No.: 10/232,637

(22) Filed: Aug. 29, 2002

(65) Prior Publication Data
US 2004/0042568 A1    Mar. 4, 2004

(51) Int. Cl.
*H03D 1/04* (2006.01)
(52) U.S. Cl. .................................. 375/346; 375/254
(58) Field of Classification Search ............. 375/346, 375/254, 278
See application file for complete search history.

(56) References Cited

U.S. PATENT DOCUMENTS 5,995,042 A    11/1999   Durboraw, III et al.  . 342/357.02
6,236,354 B1    5/2001   Krasner ................. 342/357.06
6,448,925 B1    9/2002   Kudhrethaya
6,795,490 B1 *  9/2004   Belotserkovsky ........... 375/150

FOREIGN PATENT DOCUMENTS

JP    2000028457    2/2000

* cited by examiner

*Primary Examiner*—Khai Tran
(74) *Attorney, Agent, or Firm*—Philip Wadsworth; Bruce Greenhaus; James McFarland

(57) ABSTRACT

A method of and system for detecting whether a peak of a correlation function derived from a received signal is due to a jammer. The peak is within a localized portion of the correlation function which has a total number of peaks. In one embodiment, the total number of peaks is compared to a threshold number of peaks, and the peak is identified as being due to a jammer if the total number of peaks equals or exceeds a threshold number of peaks. In a second embodiment, the peak energy in relation to a noise estimate for the localized portion of the correlation function is compared to a jammer threshold. The peak is identified as being due to a jammer if the peak energy in relation to the noise estimate is less than or equal to the jammer threshold.

17 Claims, 13 Drawing Sheets

```
    bool IsJammer() {
802→   calculate subtracted energy sum
804→   if (numRemainingEng <= jamNumEngThresh) return true;
806→   calculate mean measured noise estimate
808→   if (peakHeight < threshLin * meanMeasNoise) return true;
810→   return false;
    }
```

FIG. 8

PROCEDURE FOR JAMMER DETECTION

FIELD OF THE INVENTION

This invention relates to the fields of position determination, jammer detection, and GPS geo-location systems, and, more specifically, to procedures for detecting jammers which may introduce error into the process of determining positions based on GPS satellite or other transmissions.

RELATED ART

The GPS geo-location system is a system of earth orbiting satellites from which entities visible to the satellites are able to determine their position. Each of the satellites transmits a signal marked with a repeating pseudo-random noise (PN) code of 1,023 chips uniquely identifying the satellite. The 1,023 chips repeat every millisecond. The signal is also modulated with data bits, where each data bit has a 20 ms duration in the modulated signal.

FIG. 1 illustrates an application of the GPS geo-location system, whereby subscriber station 100 in a wireless communications system receives transmissions from GPS satellites 102a, 102b, 102c, 102d visible to the station, and derives time measurements from each of four or more of the transmissions. The station 100 then communicates the measurements to position determination entity (PDE) 104, which determines the position of the station 100 from the measurements. Alternatively, subscriber station 100 determines its own position from these measurements.

The station 100 searches for a transmission from a particular satellite by correlating the PN code for the satellite with a received signal. The received signal is typically a composite of transmissions from one or more satellites visible to the station's receiver in the presence of noise. The correlation is performed over a range of possible shifts of the PN code known as the search window W, and over a range of Doppler frequency hypotheses. Each correlation is performed over an integration time I which may be expressed as the product of $N_c$ and M, where $N_c$ is the coherent integration time, and M is number of coherent integrations which are non-coherently combined.

The correlation values are associated with the corresponding PN code shifts and Doppler frequency hypotheses to define a two-dimensional correlation function. Any peaks in the correlation function are located, and compared to a predetermined noise threshold selected so that the false alarm probability is at or below a predetermined value. A time measurement for the satellite is derived from the earliest non-sidelobe peak in the correlation function, along the code phase dimension, which exceeds the threshold.

FIG. 2 illustrates a typical correlation function for a GPS satellite along the code phase dimension. The horizontal axis represents time in terms of chips. The vertical axis represents energy in dB. The correlation function comprises a main lobe 200 and one or more side-lobes 202. The time 206 associated with the peak 204 of the main lobe forms the time measurement for the correlation function.

A problem arises when a peak is introduced into the correlation function due to an internal or external jammer. An internal jammer is a jammer which is introduced by the receiver. An example is a clock spur generated by a VCO within the receiver. An external jammer is a jammer which is introduced by a source external to the receiver. An example is a signal transmitted by a transmitter in some other wireless communications system having out-of-band emissions which overlap that of the system in use.

If peaks resulting from jammers are erroneously identified as valid peaks, valid peaks may go undetected if only a limited number of peaks can be identified. Moreover, peaks due to jammers will be reported as valid peaks. Consequently, errors may ensue in the ensuing position determination process because the time measurements derived from these peaks in no way accurately represent the line of sight distance between the GPS satellites and the receiver, the required information for position determination purposes.

SUMMARY OF THE INVENTION

A method is described of detecting whether a peak of a correlation function derived from a received signal is due to a jammer. The peak in question is within a localized portion of the correlation function, such as a Doppler segment, which may have other peaks. A Doppler segment is a portion of two-dimensional correlation function characterized by a Doppler frequency bin and a range of code phases.

In one embodiment of the method, the total number of peaks in the localized portion of the correlation function is compared to a threshold number of peaks. If the total number of peaks equals or exceeds the threshold, the peak in question is identified as being due to a jammer. Since there may be multiple peaks in the localized portion of the correlation function due to multi-path, the threshold is preferably set sufficiently high so that multiple peaks arising due to multi-path are not erroneously identified as being due to a jammer.

In one implementation, the localized portion of the correlation function comprises a plurality of samples. The plurality of samples includes peak and non-peak samples. The number of non-peak samples is compared to a threshold number of samples. If the number of non-peak samples is less than or equal to the threshold number of samples, the peak is identified as being due to a jammer. Again, since there may be multiple peaks in the localized portion of the correlation function due to multi-path, the threshold is preferably set sufficiently low so that multiple peaks arising due to multi-path are not erroneously identified as being due to a jammer.

In a second embodiment of the method, a peak in a localized portion of the correlation function is identified as being due to a jammer if the peak energy in relation to a noise estimate for the localized portion of the correlation function is less than or equal to a jammer threshold. In one implementation, the noise estimate for the localized portion of the correlation function is a mean measured noise estimate.

Memories embodying these methods and related systems are also described.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 is pseudo-code illustrating an implementation example of the method of FIG. 5D.

DETAILED DESCRIPTION

As utilized herein, terms such as "about" and "substantially" are intended to allow some leeway in mathematical exactness to account for tolerances that are acceptable in the trade. Accordingly, any deviations upward or downward from the value modified by the terms "about" or "substantially" in the range of 1% to 20% should be considered to be explicitly within the scope of the stated value.

Moreover, as used herein, the term "software" includes source code, assembly language code, binary code, firmware, macro-instructions, micro-instructions, or the like, or any combination of two or more of the foregoing.

Furthermore, the term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of software instructions and includes, without limitation, a general- or special-purpose microprocessor, finite state machine, controller, computer, digital signal processor (DSP), or the like.

Figure 1:
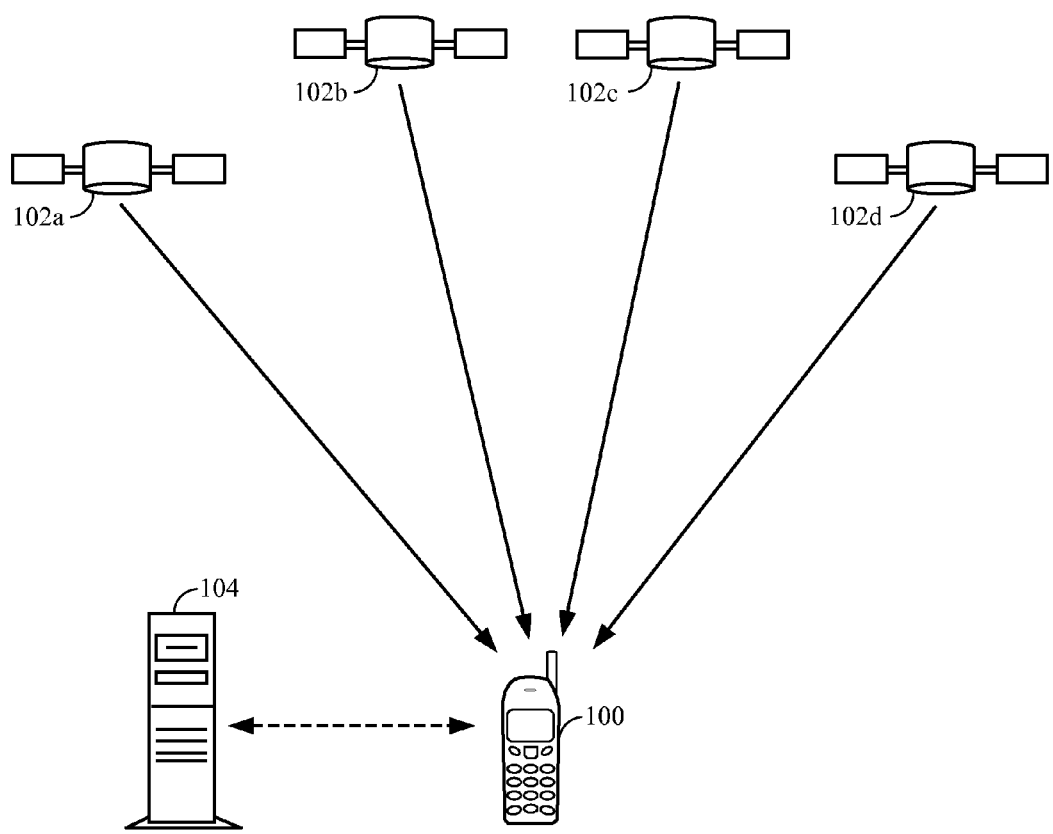
FIG. 1 is a block diagram of a GPS geo-location system.
Figure 2:
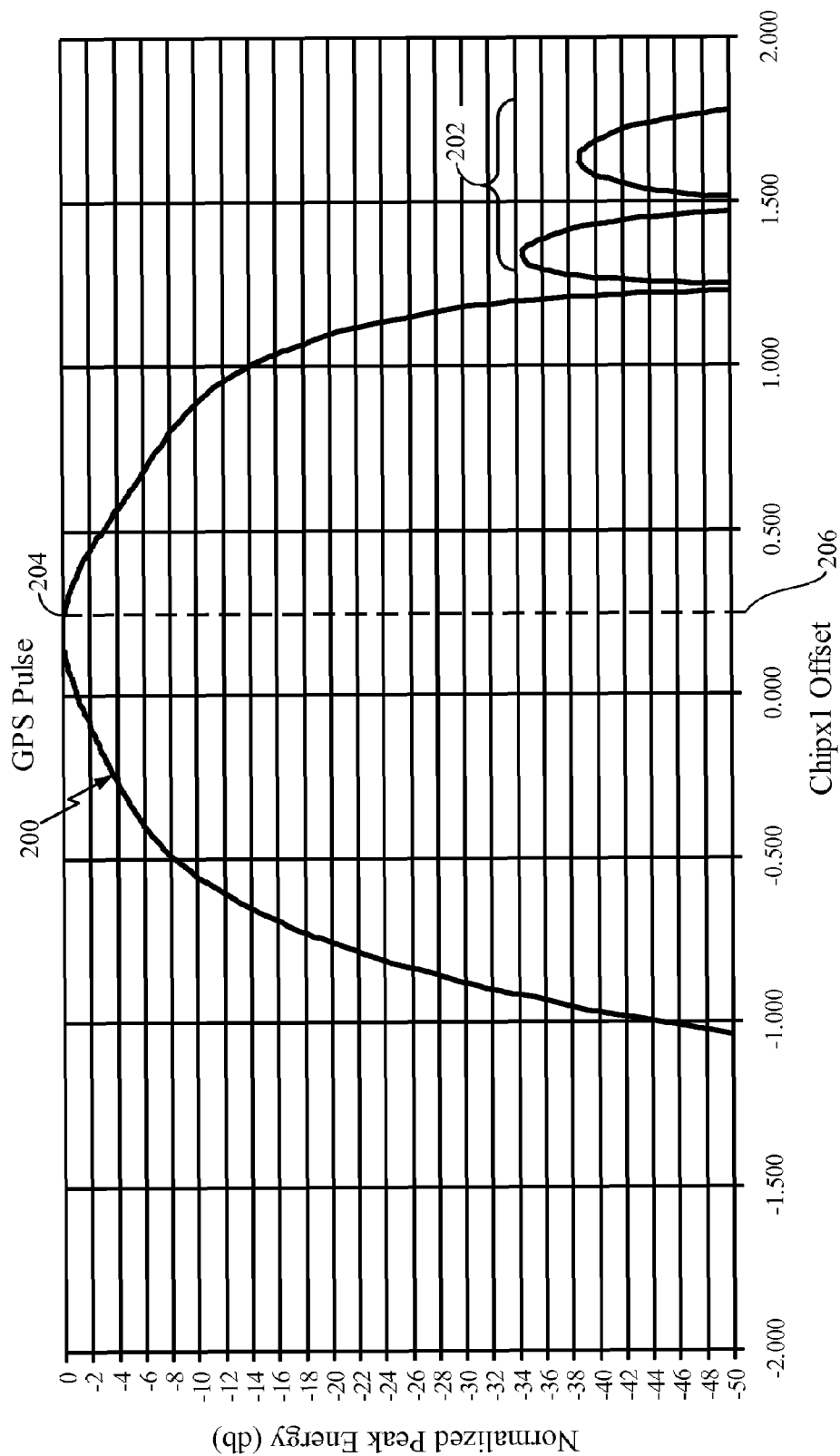
FIG. 2 is an example of a pulse of a correlation function, along the code phase dimension, derived from a GPS satellite transmission.
Figure 3:
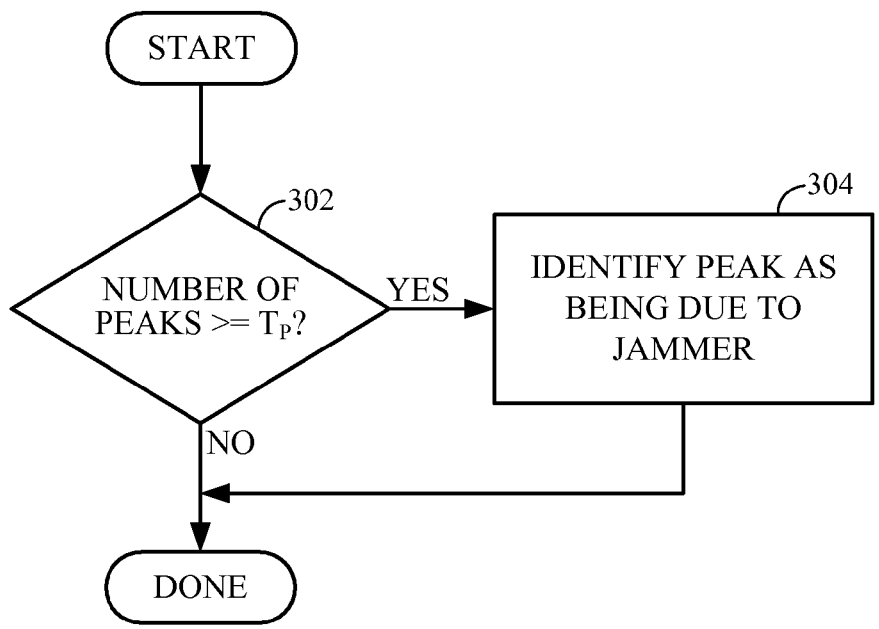
FIG. 3 is a flowchart of an embodiment of a method of identifying whether a peak of a correlation function is due to a jammer by performing a comparison step involving the total number of peaks in the localized portion of the correlation function.

FIG. 3 illustrates an embodiment of a method of detecting whether a peak of a correlation function derived from a received signal is due to a jammer. The received signal is a composite of signals transmitted by one or more GPS satellites visible to a receiver receiving the signal. In one example, the correlation function is derived by correlating the received signal with a PN code for one of the satellites over multiple code phase hypotheses and multiple Doppler frequency hypotheses. Consequently, the correlation function is defined over two dimensions, a code phase dimension, and a Doppler frequency dimension.

The peak is within a localized portion of the correlation function, such as a Doppler segment. A Doppler segment is a portion of a two-dimensional correlation function characterized by a Doppler frequency bin along the Doppler frequency axis, and a range of code phases along a code phase axis.

The method begins with step 302, which comprises comparing the total number of peaks in the localized portion of the correlation function with a threshold number of peaks $T_P$. If the total number of peaks equals or exceeds the threshold $T_P$, step 304 is performed. In step 304, the peak in question is identified as being due to a jammer.

This embodiment utilizes the property that a jammer has little or no correlation with the PN code used to derive the correlation function. As a result, it typically introduces multiple peaks in the shape of a ridge into a localized portion of the correlation function. In contrast, a transmission from a GPS satellite typically introduces a prominent peak into a localized portion of the correlation function. Consequently, a threshold $T_P$ may be used to distinguish between the two cases.

If multi-path is present, the GPS transmission might introduce other peaks into the localized portion of the correlation function. Therefore, the threshold $T_P$ is preferably set sufficiently high so that it avoids erroneously characterizing multiple peaks due to multi-path as resulting from a jammer.

Figure 6:
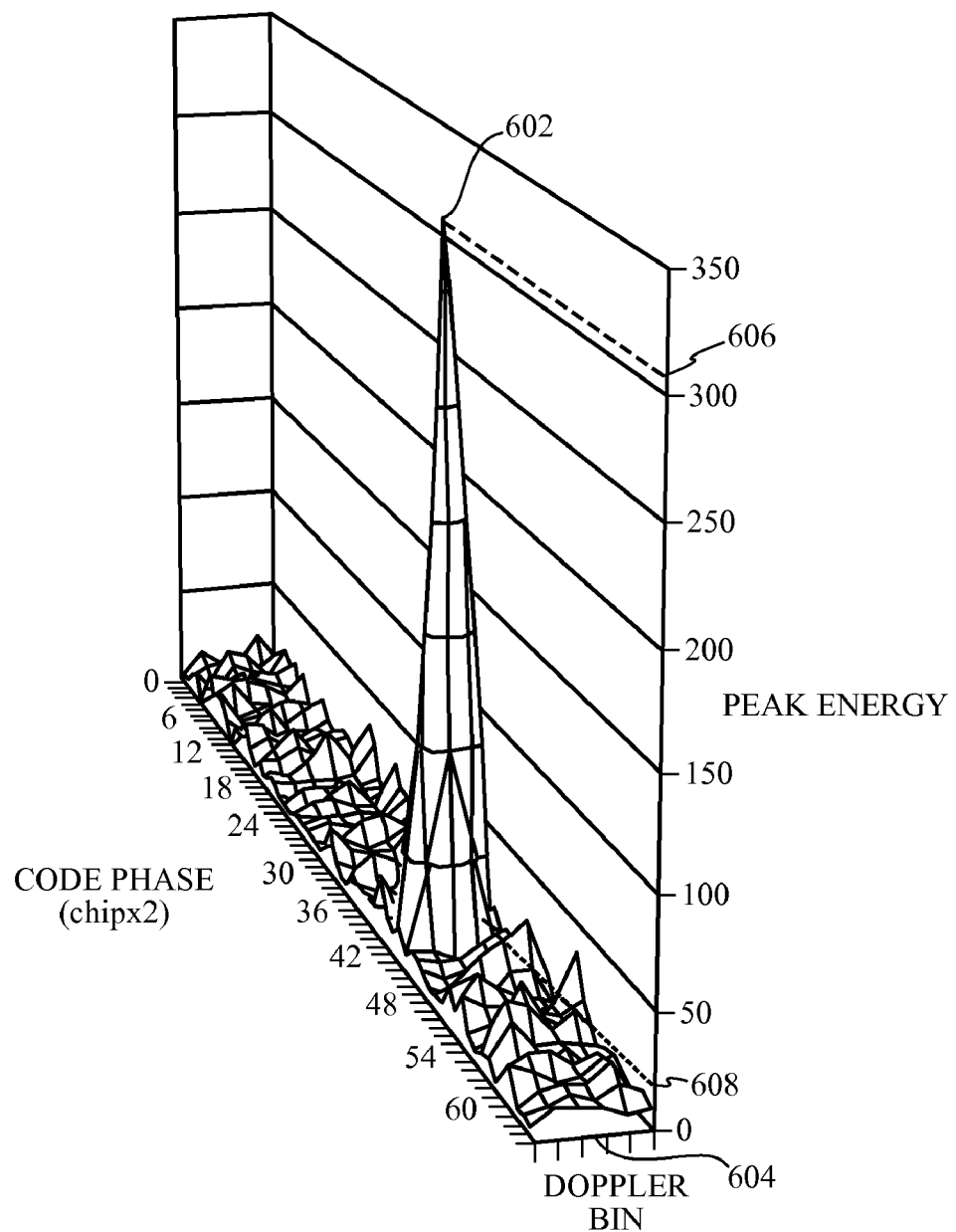
FIG. 6 illustrates an example of a valid peak in a two-dimensional correlation function.

FIG. 6 illustrates an example of a valid peak 602 within a Doppler segment of a correlation function. In this particular example, the peak 602 is located in a Doppler segment characterized by Doppler bin 604 and a range of 64 code phases (in units of chip×2). This example is to be contrasted with that illustrated in FIG. 7, which shows multiple peaks 702 in the form of a ridge introduced into a Doppler segment by a jammer. In this particular example, the ridge is located in the Doppler segment characterized by Doppler bin 704 and a range of 64 code phases (in units of chip×2).

Figure 4:
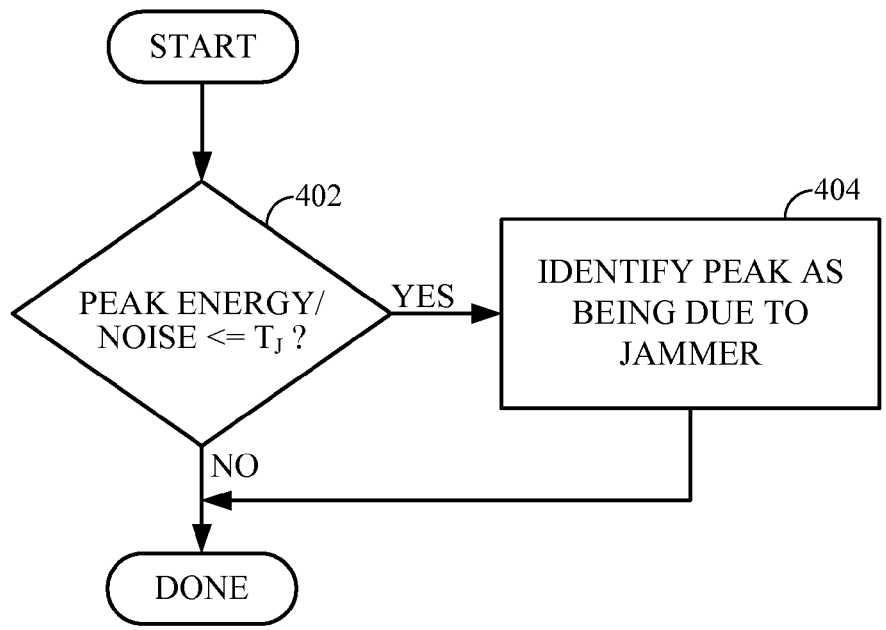
FIG. 4 is a flowchart of a second embodiment of a method of identifying whether a peak of a correlation function is due to a jammer by performing a comparison step involving the peak energy in relation to a measured noise estimate for the localized portion of the correlation function.

A second embodiment of a method of detecting whether a peak in a localized portion of a correlation function is due to a jammer is illustrated in FIG. 4. The method begins with step 402. In step 402, the peak energy in relation to a noise estimate for the localized portion of the correlation function is compared to a jammer threshold $T_J$. If the peak energy in relation to the noise estimate is less than or equal to the jammer threshold $T_J$, step 404 is performed. In step 404, the peak is identified as being due to a jammer.

This embodiment utilizes the property that the peak energy for a peak due to a jammer in relation to a noise estimate for the localized portion of the correlation function is typically much smaller than the corresponding ratio for a valid peak. Consequently, a jammer threshold can be used to distinguish between the two cases.

Figure 7:
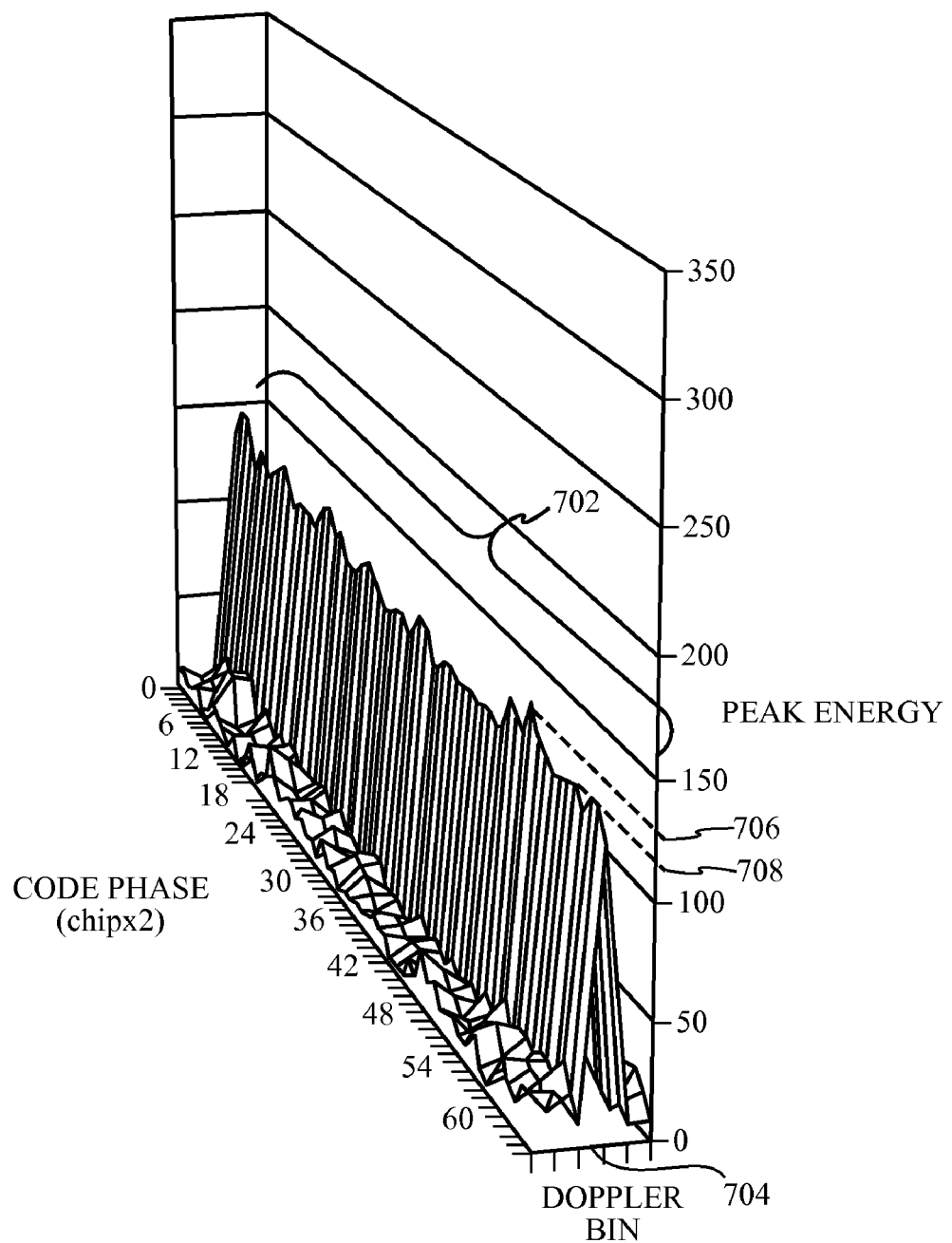
FIG. 7 illustrates an example of a ridge of peaks introduced by a jammer into a two-dimensional correlation function.

This property is best illustrated by comparing FIGS. 6 and 7. In FIG. 6, numeral 602 identifies the peak energy of a valid peak, and numeral 608 identifies an estimate of the noise level in the Doppler segment containing the peak. In FIG. 7, numeral 706 identifies the peak energy of a peak due to a jammer, and numeral 708 identifies an estimate of the noise level in the Doppler segment containing the peak. As can be seen, the ratio of the peak energy 706 to the noise estimate 708 is much smaller that the ratio of the peak energy 606 to the noise estimate 608.

In one implementation of this embodiment, the noise estimate for the localized portion of the correlation function is a mean measured noise estimate (MMNE) derived by averaging the non-peak samples of the localized portion of the correlation function. In one implementation example, a peak is characterized by a peak sample and two adjacent samples. The non-peak samples in this implementation example are all the samples in the plurality of samples except for the peak and adjacent samples used to characterize peaks in the localized portion of the correlation function.

Figure 5A:
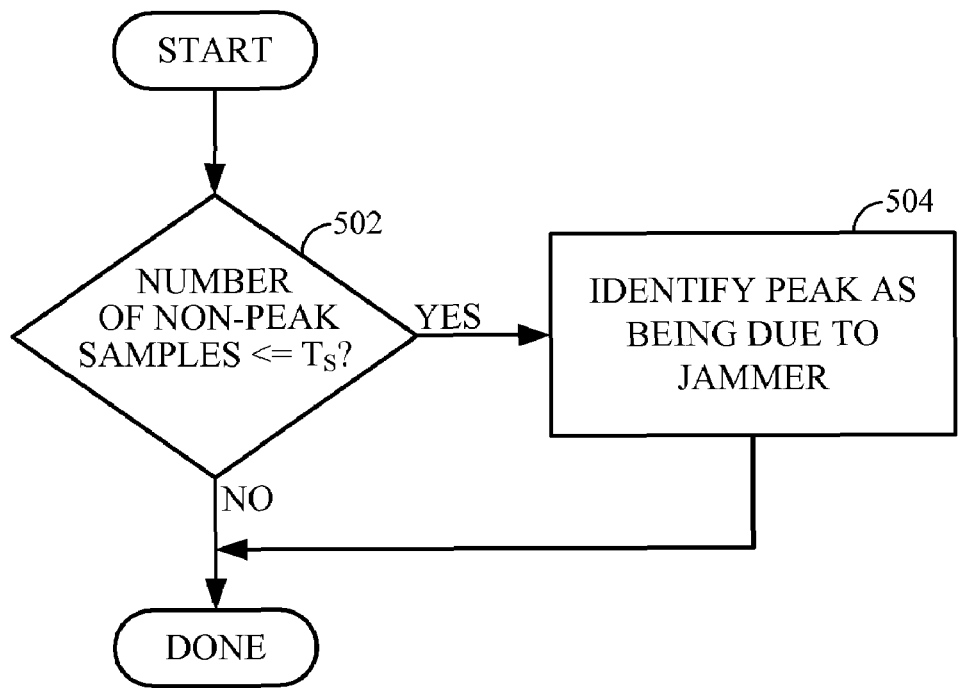
FIGS. 5A–5D are flowcharts of implementations of the methods of FIGS. 3 and 4, and combinations thereof.

FIG. 5A illustrates an implementation of the method of FIG. 3. In this implementation, the localized portion of the correlation function comprises a plurality of samples including peak and non-peak samples.

This implementation of the method begins with step 502. Step 502 comprises comparing the number of non-peak samples in the localized portion of the correlation function to a threshold number of samples $T_S$. If the number of non-peak samples is less than or equal to the threshold $T_S$, step 504 is performed. In step 504, the peak in question is identified as being due to a jammer.

Again, since there may be multiple peaks in the portion of the correlation function due to multi-path, the threshold $T_S$ is preferably set sufficiently low so that multiple peaks arising due to multi-path are not erroneously identified as being due to a jammer.

In one example, each peak in the localized portion of the correlation function is characterized by three samples, a peak sample and two adjacent samples. The non-peak samples in this example comprise all the samples in the localized portion of the correlation function except for the peak and adjacent samples.

Figure 5B:
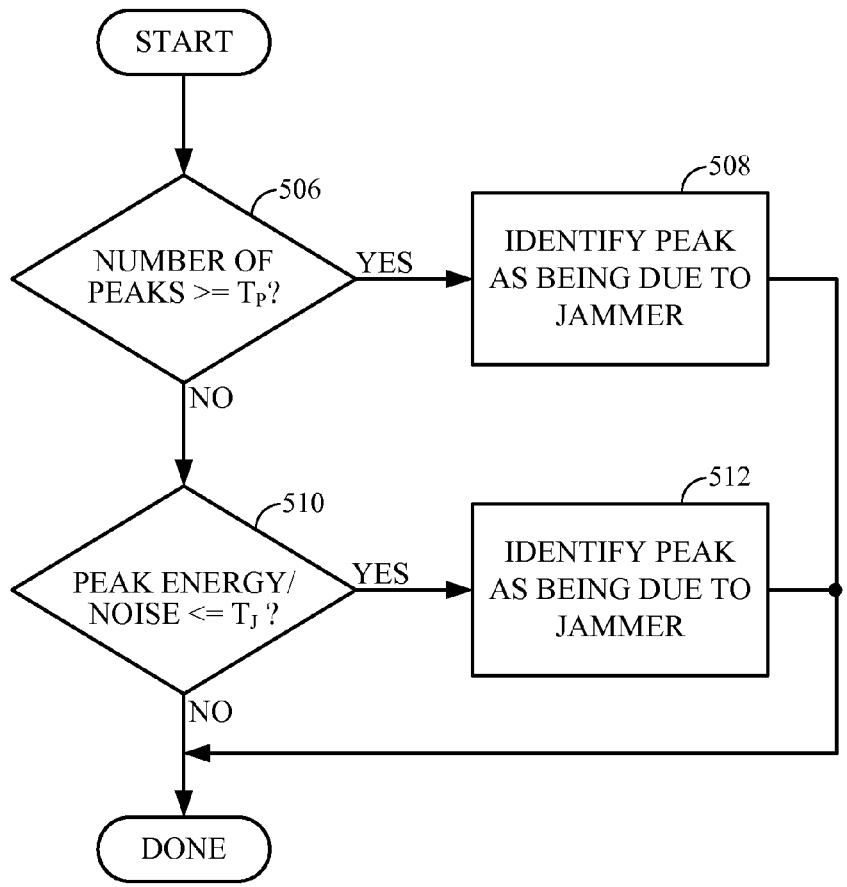

FIG. 5B illustrates an implementation which is the combination of the methods of FIGS. 3 and 4. Step 506 comprises comparing the number of peaks in the localized portion of the correlation function with a peak threshold $T_P$. If the number of peaks equals or exceeds $T_P$, step 508 is performed. In step 508, the peak in question is identified as being due to a jammer. The method then completes.

If the number of peaks is less than $T_P$, step 510 is performed. In step 510, the peak energy in relation to a noise estimate for the localized portion of the correlation is compared to a jammer threshold $T_J$. If the peak energy in relation to the noise estimate is less than or equal to $T_J$, step 512 is performed. In step 512, the peak in question is identified as being due to a jammer. The method then completes.

Figure 5C:
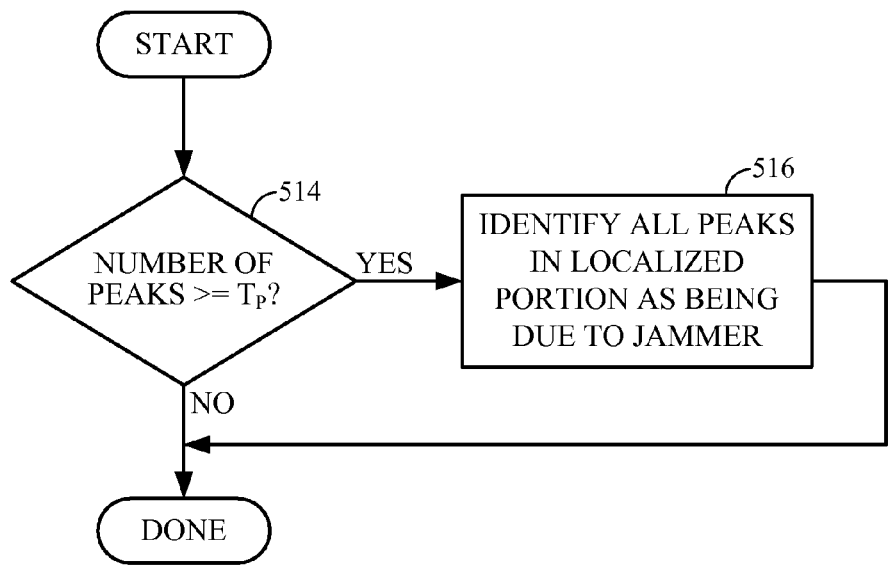

FIG. 5C illustrates another implementation of the method of FIG. 3. In this implementation, a plurality of peaks are contained within a localized portion of the correlation function. In step 514, the total number of peaks in the localized portion of the correlation function is compared to a threshold number of peaks $T_P$. If the total number of peaks equals or exceeds the threshold $T_P$, step 516 is performed. In step 516, all the peaks in the localized portion of the correlation function are identified as being due to a jammer.

The foregoing implementation is efficient since all the peaks in the localized portion of the correlation function may be classified through a single comparison performed in step 514.

Figure 5D:
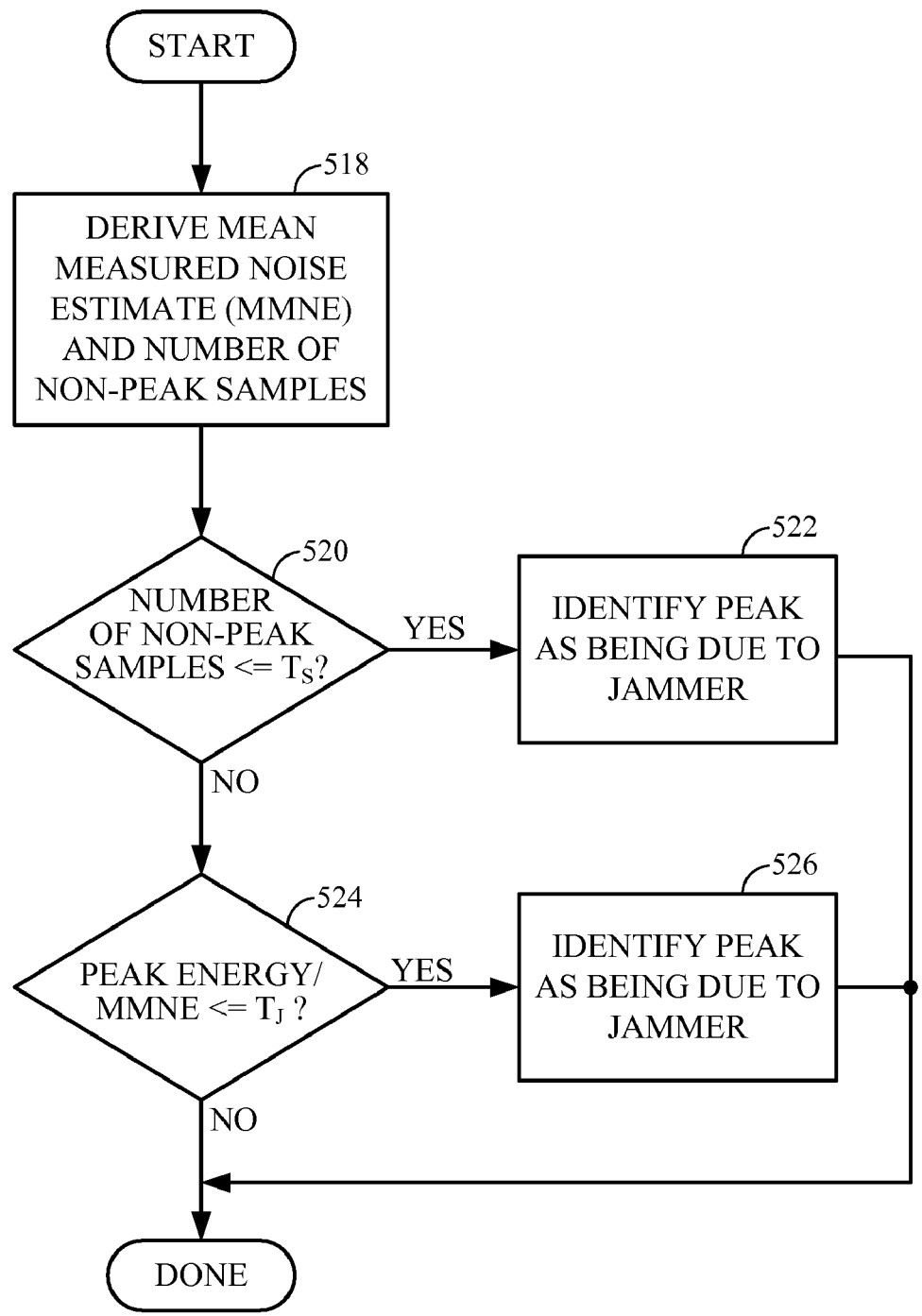

FIG. 5D illustrates an example of the implementation of FIG. 5B. In this example, the localized portion of the correlation function including the peak in question comprises a plurality of samples including peak and non-peak samples. This example begins with step 518. Step 518 comprises deriving a mean measured noise estimate (MMNE) for the localized portion of the correlation function by averaging the non-peak samples thereof.

At the same time as the MMNE is being derived, the number of non-peak samples in the localized portion of the correlation function is also counted, since this number is also required to compute the MMNE.

From step 518, the method proceeds to step 520. In step 520, the number of non-peak samples in the localized portion of the correlation function is compared with a threshold number of samples $T_S$. If the number of non-peak samples is less than or equal to the threshold number of samples $T_S$, step 522 is performed. In step 522, the peak in question is identified as being due to a jammer. The method then completes.

In step 520, if the number of non-peak samples is greater than the threshold $T_S$, step 524 is performed. In step 524, the peak energy for the peak in question in relation to the mean measured noise estimate derived in step 518 is compared to a jammer threshold $T_J$. If the peak energy in relation to the mean measured noise estimate is less than or equal to the jammer threshold $T_J$, step 526 is performed. In step 526, the peak is identified as being due to a jammer.

This implementation example is efficient, since the number of non-peak samples, and the MMNE, utilized respectively in steps 520 and 524, are both concurrently derived in step 518.

FIG. 8 illustrates pseudo-code embodying the implementation example of FIG. 5D. This pseudo-code is in the form of a subroutine which may be called in relation to each of the peaks in a list of peaks identified by a correlator.

The Doppler segment containing the peak in question is also identified to the subroutine. In this particular example, the Doppler segment is characterized by a Doppler bin arranged along the Doppler frequency axis, and a range of 64 code phases (in units of chip×2) arranged along a code phase axis. However, it should be appreciated that many other examples of Doppler segments are possible.

The pseudo-code returns a boolean flag for each of the peaks indicating whether or not the peak is due to a jammer. If so, the boolean flag returned for the peak has a value of true. If not, the boolean flag returned for the peak has a value of false.

In line 802, the "subtracted energy sum" is computed. This is the sum of all the non-peak samples in the localized portion of the correlation function. It is computed by adding all 64 samples together, and then subtracting out the samples that characterize each of the peaks in the Doppler segment (or in either of the two adjacent segments) which (a) are above the applicable noise floor, and (b) are within 15 dB of the maximum peak within the segment. Each peak in the Doppler segment is characterized by three samples, a peak sample and two adjacent samples. Consequently, this step involves subtracting off three samples for each peak in the Doppler segment which satisfies the stated conditions.

In line 804, numRemainingEng refers to the number of non-peak samples in the Doppler segment. It is compared with the threshold jamNumThresh. If the number of non-peak samples is less than or equal to the threshold, the subroutine is exited and a boolean value of true returned, indicating that the peak is identified as being due to a jammer.

In one example, the threshold is set to the value 52. This value is derived from the total number of samples in a Doppler segment (64) minus the product of the maximum number of peaks that may assumed to be present in the Doppler segment due to multi-path (4) and the number of samples used to characterize each of these peaks (3).

In line 806, the mean measured noise estimate is computed by dividing the subtracted energy sum calculated in line 802 by numRemainingEng.

In line 808, peakHeight is the peak energy (in linear terms) associated with the peak in question, meanMeasNoise is the mean measured noise estimate, and threshLin is a jammer threshold expressed in linear terms. The value peakHeight is compared with the product of threshLin and meanMeasNoise. If peakHeight is less than this product, the subroutine is exited and a boolean value of true is returned, indicating that the peak is identified as being due to a jammer.

If peakHeight equals or exceeds the product of threshLin and meanMeasNoise, line 810 is executed. In line 810, the subroutine is exited and a boolean value of false is returned, indicating that the peak has not been identified as being due to a jammer.

The jammer threshold which is used in line 808 depends on the parameters which govern the derivation of the correlation function. In particular, the parameters which are important in this regard are the coherent integration time ($N_c$), and the number (M) of coherent integrations which are non-coherently combined.

Figure 9:
FIG. 9 is a table indicating examples of jammer thresholds, in dB and in linear terms, useful in the pseudo-code of FIG. 8.

FIG. 9 is a table illustrating the jammer threshold, in both linear terms and in dB, which may be used in the pseudo-code of FIG. 8 for certain settings of the correlation parameters. The column of jammer thresholds in linear terms is identified with numeral 902. The column of jammer thresholds in dB is identified with numeral 904.

The following equation may be used to convert the threshold back and forth between linear terms and in dB:

$$threshLin = 1 + (2/M)^{1/2} * 10^{(threshdB/20)} \quad (1)$$

The pseudo code of FIG. 8 utilizes two distinct tests for identifying peaks due to jammers. The first test, embodied in lines 802 and 804, is based on the total number of peaks in the Doppler segment. The second test, embodied in lines 806–810, is based on the peak energy for the peak in relation to the mean measured noise estimate for the Doppler segment.

Figure 10:
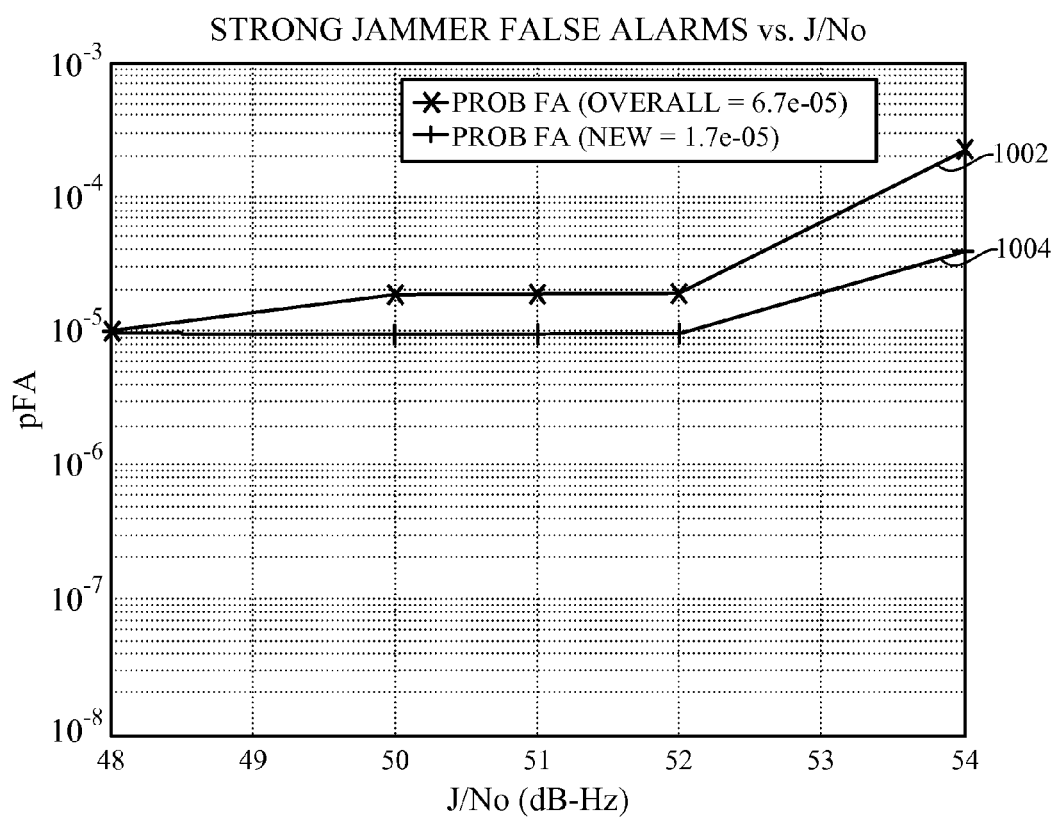
FIG. 10 is a plot illustrating the reduction in jammer false alarm rate which is possible through utilization of various aspects of embodiments of the invention.

The first test may catch a significant number of jammer false alarms that would not have been caught by the second test. A jammer false alarm is a peak due to a jammer which is erroneously accepted as a valid peak. This is best seen in FIG. 10, which plots the jammer false alarm rate as a function of the power J of the jammer in relation to the noise density $N_0$. The curve identified with numeral 1002 is the false alarm rate assuming only the second test above is in effect. The curve identified with numeral 1004 is the false alarm rate assuming the first and second tests are in effect. As can be seen, particularly for the stronger jammers represented at the rightmost portion of the figure, the reduction in false alarm rate due to enforcement of the first test is significant.

Figure 11:
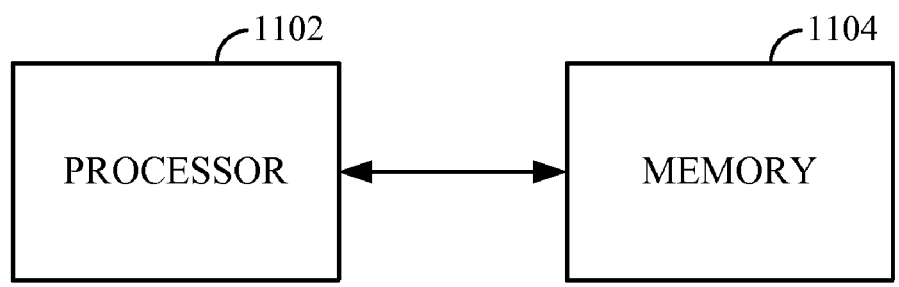
FIG. 11 is a block diagram of one embodiment of a system for detecting whether a peak in a correlation function is due to a jammer.

An embodiment of a system for detecting whether a peak of a correlation function derived from a received signal is due to a jammer is illustrated in FIG. 11. As illustrated, the system comprises processor 1102 and memory 1104. The memory 1104 tangibly embodies a series of instructions for performing any of the methods of FIGS. 3, 4, 5A–5D, or any of the embodiments, implementations, or examples thereof which have been described or suggested. The processor is configured to access and execute the software instructions tangibly embodied by memory 1104, thereby detecting whether a peak in a correlation function stored in memory 1104 is due to a jammer.

Figure 12:
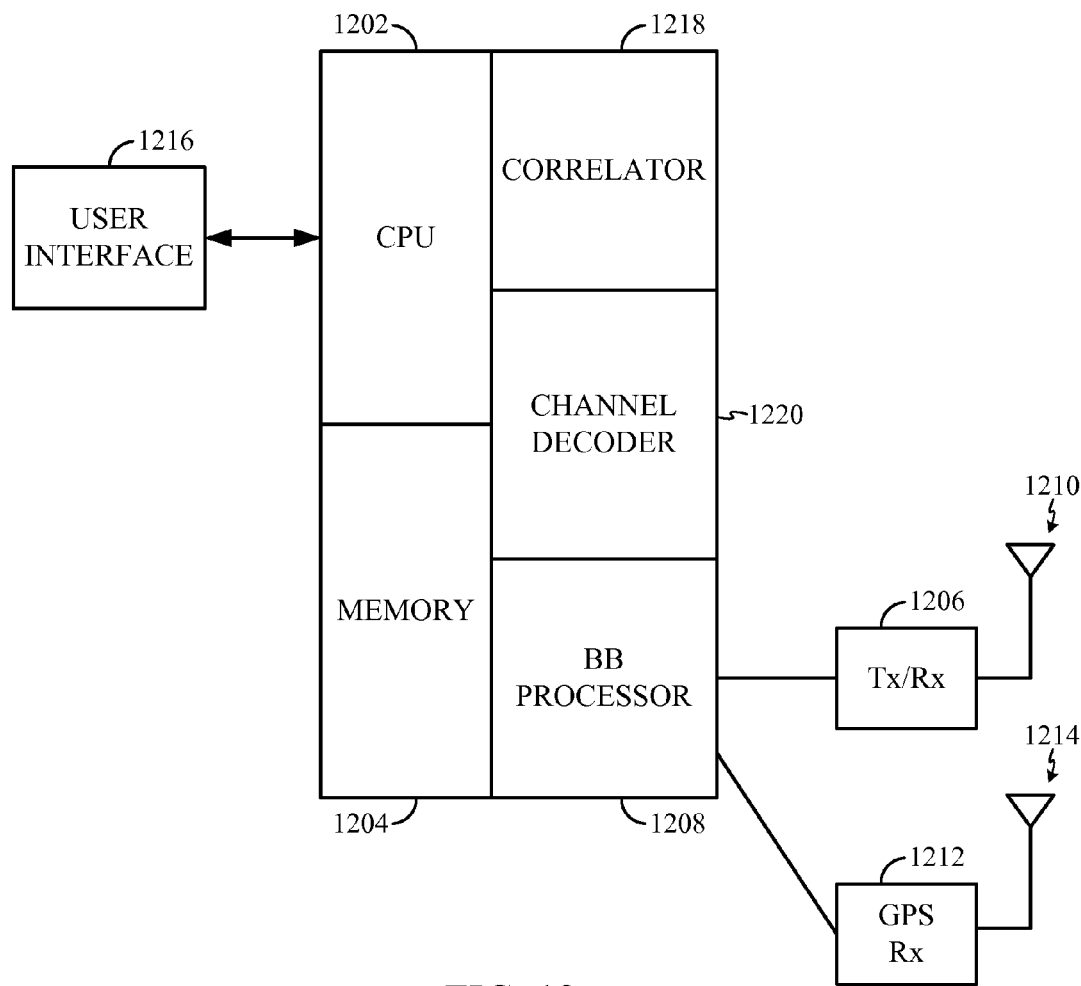
FIG. 12 is a block diagram of a subscriber station in a wireless communications system embodying or incorporating the system of FIG. 11.

An embodiment of a subscriber station in a wireless communication system is illustrated in FIG. 12. This particular subscriber station is configured to embody or incorporate the system of FIG. 11.

Radio transceiver 1206 is configured to modulate baseband information, such as voice or data, onto an RF carrier, and demodulate a modulated RF carrier to obtain baseband information.

An antenna 1210 is configured to transmit a modulated RF carrier over a wireless communications link and receive a modulated RF carrier over a wireless communications link.

Baseband processor 1208 is configured to provide baseband information from CPU 1202 to transceiver 1206 for transmission over a wireless communications link. CPU 1202 in turn obtains this baseband information from an input device within user interface 1216. Baseband processor 1208 is also configured to provide baseband information from transceiver 1206 to CPU 1202. CPU 1202 in turn provides this baseband information to an output device within user interface 1216.

User interface 1216 comprises a plurality of devices for inputting or outputting user information such as voice or data. The devices typically included within the user interface include a keyboard, a display screen, a microphone, and a speaker.

GPS receiver 1212 is configured to receive and demodulate GPS satellite transmissions, and provide the demodulated information to correlator 1218.

Correlator 1218 is configured to derive GPS correlation functions from the information provided to it by GPS receiver 1212. For a given PN code, correlator 1218 produces a correlation function which is defined over a range of code phase hypotheses which define a search window W, and over a range of Doppler frequency hypotheses. Each individual correlation is performed in accordance with defined coherent and non-coherent integration parameters ($N_c$, M).

Correlator 1218 is also configured to derived pilot-related correlation functions from information relating to pilot signals provided to it by transceiver 1206. This information is used by the subscriber station to acquire wireless communications services.

Channel decoder 1220 is configured to decode channel symbols provided to it by baseband processor 1208 into underlying source bits. In one example, where the channel symbols are convolutionally encoded symbols, the channel decoder is a Viterbi decoder. In a second example, where the channel symbols are serial or parallel concatenations of convolutional codes, the channel decoder 1220 is a turbo decoder.

Memory 1204 in configured to hold software instructions embodying any of the methods of FIGS. 3, 4, 5A–5D, or any of the embodiments, implementations, or examples thereof which have been described or suggested. CPU 1202 is configured to access and execute these software instructions to detect whether the peaks in the GPS correlation functions provided to it by correlator 1218 are due to jammers.

CPU 1202 is also configured to derive time measurements from peaks located in the correlation functions. In addition, CPU 1202 is configured to determine the root mean square error (RMSE) associated with each of the measurements.

These measurements and RMSE values are provided to a PDE (not shown). The PDE weights each of the measurements based on the inverse of its corresponding RMSE value, and then estimates the location the subscriber station based on the weighted measurements. Alternatively, the subscriber station determines its own location from this information.

In one embodiment, the CPU 1202 flags time measurements derived from peaks which are due to jammers, and these measurements are either ignored or de-weighted in the position determination process.

While various embodiments, implementations and examples have been described, it will be apparent to those of ordinary skill in the art that many more embodiments, implementations and examples are possible that are within the scope of this invention. In particular, embodiments are possible where jammer detection in accordance with the invention is performed in relation to signals transmitted by base stations in wireless communications systems, including omni base stations and individual sectors in a multi-sector cell, or signals transmitted by combinations of base stations and GPS satellites. Consequently, the invention is not to be limited except in relation to the appended claims.

What is claimed is:

1. A method of detecting whether a peak of a correlation function derived from a received signal is due to a jammer, said peak being within a localized portion of the correlation function having a total number of peaks, comprising:
    comparing the total number of peaks with a threshold number of peaks; and
    identifying said peak as being due to a jammer if the total number of peaks equals or exceeds the threshold.

2. The method of claim 1 wherein the total number of peaks within the localized portion of the correlation function define a plurality of peaks, and the identifying step comprises identifying all of the peaks in said plurality of peaks as being due to a jammer if the total number of peaks equals or exceeds the threshold.

3. A method of detecting whether a peak of a correlation function derived from a received signal is due to a jammer, the peak being within a localized portion of the correlation function having a noise estimate, and the peak having a peak energy, comprising;
    comparing the peak energy in relation to the noise estimate to a jammer threshold; and
    identifying the peak as being due to a jammer if the peak energy in relation to the noise estimate is less than or equal to the jammer threshold.

4. The method of claim 3 wherein the noise estimate is a mean measured noise estimate.

5. The method of claim 4 wherein the identifying step comprises identifying the peak as being due to a jammer if the peak energy is less than or equal to the product of the jammer threshold and the mean measured noise estimate.

6. The method of claim 4 wherein the localized portion of the correlation function comprises a plurality of samples including peak and non-peak samples, and the mean measured noise estimate is derived by averaging the non-peak samples.

7. The method of claim 6 wherein each peak in the localized portion is characterized by a peak sample and two adjacent samples, and the non-peak samples comprise all the samples in the plurality of samples except for the peak and adjacent samples.

8. The method of claim 1 wherein the localized portion of the correlation function comprises a plurality of samples including peak and non-peak samples, and the identifying step comprises identifying said peak as being due to a jammer if the number of non-peak samples is less than or equal to a threshold number of samples.

9. A memory tangibly embodying the method of claim 1.

10. A memory tangibly embodying the method of claim 3.

11. The method of claim 1 wherein the localized portion of the correlation function is a Doppler segment.

12. The method of claim 3 wherein the localized portion of the correlation function is a Doppler segment.

13. The method of claim 8 wherein the identifying step comprises identifying all of the peaks within the localized portion of the correlation function as being due to a jammer if the number of non-peak samples is less than or equal to the threshold number of samples.

14. A system for detecting whether a peak of a correlation function derived from a received signal is due to a jammer comprising a processor and the memory of claim 9, wherein the processor is configured to access and execute the software instructions tangibly embodied by the memory.

15. A system for detecting whether a peak of a correlation function derived from a received signal is due to a jammer comprising a processor and the memory of claim 10, wherein the processor is configured to access and execute the software instructions tangibly embodied by the memory.

16. A method of detecting whether a peak of a correlation function derived from a received signal is due to a jammer, said peak being within a localized portion of the correlation function having a total number of peaks, comprising:
    a step for comparing the total number of peaks with a threshold number of peaks; and
    a step for identifying said peak as being due to a jammer if the total number of peaks equals or exceeds the threshold.

17. A method of detecting whether a peak of a correlation function derived from a received signal is due to a jammer, the peak being within a localized portion of the correlation function having a noise estimate, and the peak having a peak energy, comprising:
    a step for comparing the peak energy in relation to the noise estimate to a jammer threshold; and
    a step for identifying the peak as being due to a jammer if the peak energy in relation to the noise estimate is less than or equal to the jammer threshold.

* * * * *